(12) United States Patent
Uenishi

(10) Patent No.: US 11,440,152 B2
(45) Date of Patent: Sep. 13, 2022

(54) MACHINING ENVIRONMENT MEASUREMENT DEVICE

(71) Applicant: FANUC Corporation, Yamanashi (JP)

(72) Inventor: Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 350 days.

(21) Appl. No.: 16/547,577

(22) Filed: Aug. 22, 2019

(65) Prior Publication Data

US 2020/0070295 A1 Mar. 5, 2020

(30) Foreign Application Priority Data

Aug. 31, 2018 (JP) .............................. JP2018-162448

(51) Int. Cl.
*B23Q 17/12* (2006.01)
*G01H 1/00* (2006.01)

(52) U.S. Cl.
CPC ............. *B23Q 17/12* (2013.01); *G01H 1/003* (2013.01)

(58) Field of Classification Search
CPC .................... B23Q 17/12; G01H 1/003; G05B 2219/37434
See application file for complete search history.

(56) References Cited

U.S. PATENT DOCUMENTS

| 5,425,272 A | * | 6/1995 | Rhodes | G01N 29/12 73/579 |
| 5,663,894 A | * | 9/1997 | Seth | G05B 19/4063 702/56 |
| 5,922,963 A | * | 7/1999 | Piety | G01N 29/46 73/659 |
| 6,484,109 B1 | | 11/2002 | Lofall | |
| 6,507,804 B1 | * | 1/2003 | Hala | G01H 1/003 702/182 |
| 6,845,340 B2 | * | 1/2005 | Edie | B23Q 17/0971 324/522 |

(Continued)

FOREIGN PATENT DOCUMENTS

| JP | H2116453 A | 5/1990 |
| JP | H6262490 A | 9/1994 |

(Continued)

*Primary Examiner* — Kyle R Quigley
(74) *Attorney, Agent, or Firm* — Hauptman Ham, LLP

(57) ABSTRACT

A machining environment measurement device, which enables automatic identification of a vibration source which may cause defects in a machined surface based on pieces of vibration data without performing an actual machining process, includes a reference machining data storage unit that stores reference machining data computed based on time-series data of vibration measured in advance in an ideal machining environment; a data acquisition unit that acquires time-series data of vibration of at least a holder attached to a spindle of the machine tool detected by a holder measurement sensor; an analysis unit that analyzes the time-series data and computes feature data indicating a feature of the time-series data; a comparative determination unit that compares the feature data with the reference machining data and determines a machining environment of the machine tool; and a display unit that displays the determination result of the comparative determination unit.

9 Claims, 8 Drawing Sheets

(56) References Cited

U.S. PATENT DOCUMENTS

| | | | | |
|---|---|---|---|---|
| 10,228,677 B2* | 3/2019 | Ando | ............... | G05B 19/404 |
| 2007/0088454 A1* | 4/2007 | Jalluri | ............... | G05B 19/4065 |
| | | | | 700/159 |
| 2010/0023307 A1* | 1/2010 | Lee | ............... | G05B 23/0254 |
| | | | | 703/7 |
| 2011/0290024 A1* | 12/2011 | Lefler | ............... | G01H 1/003 |
| | | | | 73/579 |
| 2011/0307093 A1* | 12/2011 | Tsai | ............... | G05B 19/4062 |
| | | | | 700/177 |
| 2015/0248828 A1* | 9/2015 | Cloutier | ............... | G01H 1/00 |
| | | | | 73/579 |
| 2016/0103038 A1* | 4/2016 | Lacaille | ............... | G05B 23/0229 |
| | | | | 73/114.07 |

FOREIGN PATENT DOCUMENTS

| JP | 2006-159299 A | 6/2006 |
|---|---|---|
| JP | 201048758 A | 3/2010 |

* cited by examiner

FIG.6

| | SPINDLE UNIT, SPINDLE ROTATION | | | |
|---|---|---|---|---|
| | SPECTRAL ANALYSIS RESULT | | | |
| FREQUENCY / PARAMETER | $S_1$ | $S_2$ | ... | $S_n$ |
| ACCELERATION (m/s$^2$) | $S_{A1}$ | $S_{A2}$ | ... | $S_{An}$ |
| SPEED (mm/s) | $S_{V1}$ | $S_{V2}$ | ... | $S_{Vn}$ |
| DISPLACEMENT (μm) | $S_{D1}$ | $S_{D2}$ | ... | $S_{Dn}$ |

FIG.7

| | SPINDLE UNIT, SPINDLE ROTATION | | | |
|---|---|---|---|---|
| | SPECTRAL ANALYSIS RESULT | | | |
| FREQUENCY / PARAMETER | $F_1$ | $F_2$ | ... | $F_n$ |
| ACCELERATION (m/s$^2$) | $F_{A1}$ | $F_{A2}$ | ... | $F_{An}$ |
| SPEED (mm/s) | $F_{V1}$ | $F_{V2}$ | ... | $F_{Vn}$ |
| DISPLACEMENT (μm) | $F_{D1}$ | $F_{D2}$ | ... | $F_{Dn}$ |

FIG.8

$$\text{DISTANCE Di BETWEEN Si AND Fi} = \sqrt{(F_{Ai}-S_{Ai})^2+(F_{Vi}-S_{Vi})^2+(F_{Di}-S_{Di})^2}$$

$$\text{SCORE Xi BASED ON Si AND Fi} = \begin{cases} 100 & Di < Th1 \\ 80 & Th1 \leq Di < Th2 \\ 60 & Th2 \leq Di < Th3 \\ 40 & Th3 \leq Di \end{cases}$$

$$\text{SCORE X OF TIME SERIES DATA} = \frac{1}{n}\Sigma\, Xi$$

FIG.9

| EVALUATION | SCORE X |
|---|---|
| A | 90 OR MORE |
| B | 80 OR MORE BUT LESS THAN 90 |
| C | 70 OR MORE BUT LESS THAN 80 |
| D | 60 OR MORE BUT LESS THAN 70 |
| E | LESS THAN 60 |

FIG.11

| LOCATION OF VIBRATION OCCURRENCE | MAIN FREQUENCY COMPONENT | GUIDANCE |
|---|---|---|
| HOLDER UNIT | Fi(Hz) | THIS IS POSSIBLY CAUSED BY VIBRATION OF FANS A OR B IN CONTROL PANEL. |
| HOLDER UNIT SPINDLE UNIT | Fj(Hz) | THIS IS POSSIBLY CAUSED BY VIBRATION OF PERIPHERAL DEVICE (MIST COLLECTOR A). |
| TABLE UNIT | Fk~Fl(Hz) | THIS IS POSSIBLY CAUSED BY VIBRATION OF ROBOT A OR MACHINE TOOLS A, B, OR C INSTALLED IN VICINITY. |
| ⋮ | ⋮ | ⋮ |

MACHINING ENVIRONMENT MEASUREMENT DEVICE

RELATED APPLICATIONS

The present application claims priority to Japanese Patent Application Number 2018-162448 filed Aug. 31, 2018, the disclosure of which is hereby incorporated by reference herein in its entirety.

BACKGROUND OF THE INVENTION

1. Field of the Invention

The present disclosure relates to a machining environment measurement device and relates in particular to a machining environment measurement device that measures a machining environment that affects high quality machining.

2. Description of the Related Art

In recent years, high quality machining for IT components and exterior components such as accessories is frequently performed by cutting machines such as machining centers (for example, see Japanese Patent Application Laid-Open No. 2006-159299). Single crystal diamond and polycrystalline diamond (PCD) are used in such high quality machining processes. High quality machining requires an installation environment characterized by high precision spindle runout, low vibration thereof, and absence of disturbance vibration.

In high quality machining, for example, when the vibration of the spindle increases due to a defect of the spindle caused by collision, a defect in a machined surface occurs. Also, when vibration of a mist collector which is installed as a peripheral device and a vibration of a fan for cooling are transmitted to the machine tool, they may adversely affect the machined surface. Specifically, a defect in a machined surface occurs. In addition, if the load resistance of the floor on which the machine tool is installed is not sufficient, then a defect in a machined surface occurs under various influences including the vibration during acceleration and deceleration and vibration originating from an adjacent machine tool.

When a defect in a machined surface occurs, the current mass production process is halted. In addition, in order to solve the problem in high quality machining, vibration measurement machine may be used to examine the factor causing the occurrence of the vibration in the spindle and a table and factors causing various disturbances. In addition, these factors are removed and the improvement of the machining environment is realized. In these examination processes, various measurement devices are used. Also, in order to determine from the result of measurement a phenomenon that causes a defect in the machining process, analysis is performed using external devices such as a personal computer and spending a large amount of time. Also, tasks are performed by skilled operators having knowledge and experiences in the high quality machining. Accordingly, the costs associated therewith will be large.

In view of the above, an object of the present disclosure is to provide a machining environment measurement device which enables automatic identification of a vibration source which may cause defects in a machined surface based on pieces of vibration data without performing an actual machining process.

SUMMARY OF THE INVENTION

According to the present disclosure, a machining environment measurement device is used as a device for simplified measurement and determination of an influence of a machining environment on the machining process in a machine tool. The vibration states of various units are measured using the machining environment measurement device, and the influence upon the machining process is comprehensively determined. A "machining environment" as used herein is a concept that encompasses states of installation of the machine tool itself and machines installed around the machine tool, and the states of the fans and other peripheral devices attached to the machine tool itself. When the machining environment is to be measured, a machine executes a predetermined operation which is predetermined as a benchmark operation. The respective pieces of physical quantity data measured at this time (vibration information) are compared with reference machining data which includes vibration information measured in advance when a benchmark operation was performed in an ideal machining environment (a machining environment where high quality machining is possible). In addition, the degree of difference is evaluated between the data measured in the current machining environment and the reference machining data. Also, the levels of vibrations permissible vary depending on the required quality of the machined surface. As a result, the difference between the respective pieces of current data of the spindle and the table and the reference machining data is indicated as a score, and the degree of the machining quality for which the current machining environment is suitable is indicated.

An aspect of the present disclosure provides a machining environment measurement device that measures an influence of a vibration on a machining process in a machine tool, the machining environment measurement device including: a reference machining data storage unit that stores reference machining data computed on the basis of time-series data of vibration measured in advance in an ideal machining environment; a data acquisition unit that acquires time-series data of vibration of at least a holder attached to a spindle of the machine tool, wherein the vibration of the holder is detected by a holder measurement sensor; an analysis unit that analyzes the time-series data acquired by the data acquisition unit and computes feature data indicative of a feature of the time-series data; a comparative determination unit that compares the feature data indicative of the feature of the time-series data computed by the analysis unit with the reference machining data stored in the reference machining data storage unit and makes determination of a machining environment of the machine tool; and a display unit that displays a result of the determination made by the comparative determination unit.

According to the aspect of the present disclosure, the current machining environment is evaluated with reference to the benchmark, i.e., a machining environment suitable for the purpose of the machining and its score is displayed. Also, when periodic inspections and the like are carried out using the machining environment measurement device, it is made possible for an inexperienced operator to confirm the change in the machining environment readily by the score and perform repair work in a preventive manner upon the machine tool before it is actually necessitated.

According to the present disclosure, even when a machining process is not actually performed, whether or not the environment is a suitable one where a machine performs machining suited to the purpose of machining (e.g., high quality machining) can be readily confirmed. If a defect in a machined surface suddenly occurs, it is made possible to determine whether or not the defect at issue is caused by the environment (vibration) or any other factor (chips or mistake by an operator). Also, when a defect in a machined surface occurs in a case where a plurality of cutting machines are used in different installation environments, it is made possible to quickly identify the difference between the installation environments of the respective cutting machines. Further, the display of the scores makes it possible to determine the machining capability in accordance with the content of the machining process.

BRIEF DESCRIPTION OF THE DRAWINGS

The above-described and other objects and features of the present disclosure will be apparent from the following description of embodiments with reference to the accompanying drawings, in which:

FIG. 6 is a diagram that illustrates an example of feature data indicative of a feature of the time-series data;

FIG. 7 is a diagram that illustrates an example of reference machining data;

FIG. 8 is a diagram that illustrates an example of computation of scores by frequency and a score of the time-series data;

FIG. 9 is a diagram that illustrates an example of a criterion for evaluation and determination based on the scores;

FIG. 11 is a diagram that illustrates an example of cause estimation data.

DETAILED DESCRIPTION OF THE PREFERRED EMBODIMENTS

The embodiments of the present disclosure will be described hereinbelow with reference to the drawings.

Figure 1:
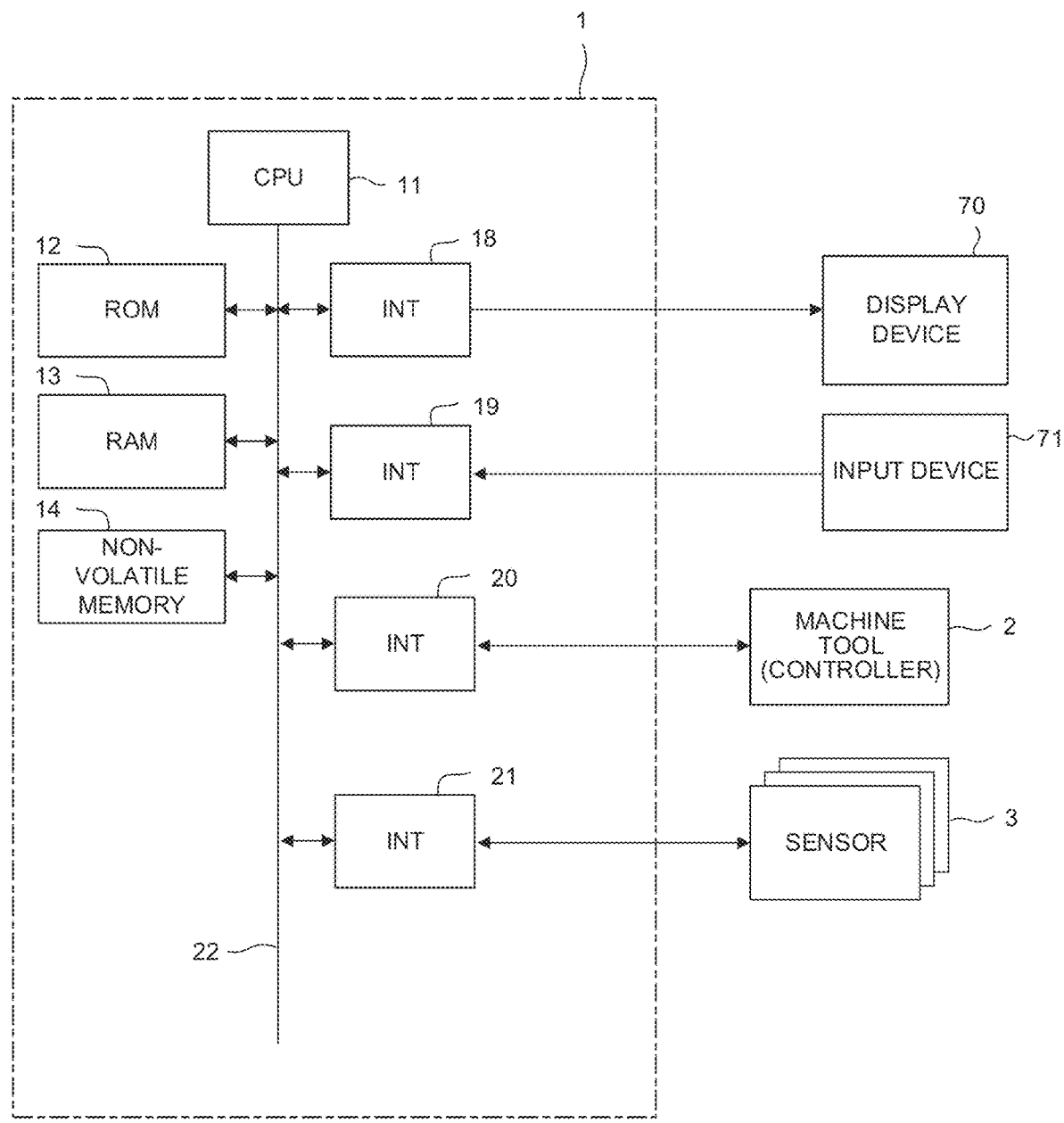
FIG. 1 is a schematic hardware configuration diagram of a machining environment measurement device according to an embodiment.

FIG. 1 is a schematic hardware configuration diagram that illustrates a machining environment measurement device 1 according to an embodiment of the present disclosure. The machining environment measurement device 1 of this embodiment is implemented on a controller that controls a machine tool 2. Also, the machining environment measurement device 1 may be implemented on a computer such as a personal computer installed along with the controller that controls the machine tool or a cell computer, host computer, cloud server, etc. connected to the machine tool via a network. FIG. 1 illustrates an example case where the machining environment measurement device 1 is implemented on a computer installed along with a controller that controls the machine tool.

A central processing unit (CPU) 11 provided in the machining environment measurement device 1 according to this embodiment is a processor that controls the machining environment measurement device 1 as a whole. The CPU 11 reads a system program stored in a read-only memory (ROM) 12 connected thereto via a bus 22 and controls the entire machining environment measurement device 1 in accordance with the system program. Temporary calculation data and data to be displayed on a display device 70 are stored in a random access memory (RAM) 13. Various pieces of data input by an operator using an input device 71 may be stored in the RAM 13 via an interface 19.

A non-volatile memory 14 may be a static random access memory (SRAM) or a solid state drive (SSD) backed up by a not-shown battery, for example. The non-volatile memory 14 is a memory device whose storage state is maintained even when the machining environment measurement device 1 is turned off. The non-volatile memory 14 may store data or programs input using the input device 71, and data acquired offline (via a not-shown USB device or the like) or online (via the interface 20) from machining device 2, for example. Detected values, which are detected by various sensors 3 (an acceleration sensor that detects vibration and the like) attached to the machining device 2, for example, are acquired offline (via a not-shown USB device or the like) or online (via the interface 21) and stored in the non-volatile memory 14. The data, programs, etc. that are stored in the non-volatile memory 14 may be loaded in use onto the RAM 13. Also, various algorithms needed to analyze the time-series data and system programs needed to execute other necessary processes are written in advance to the ROM 12.

Figure 2:
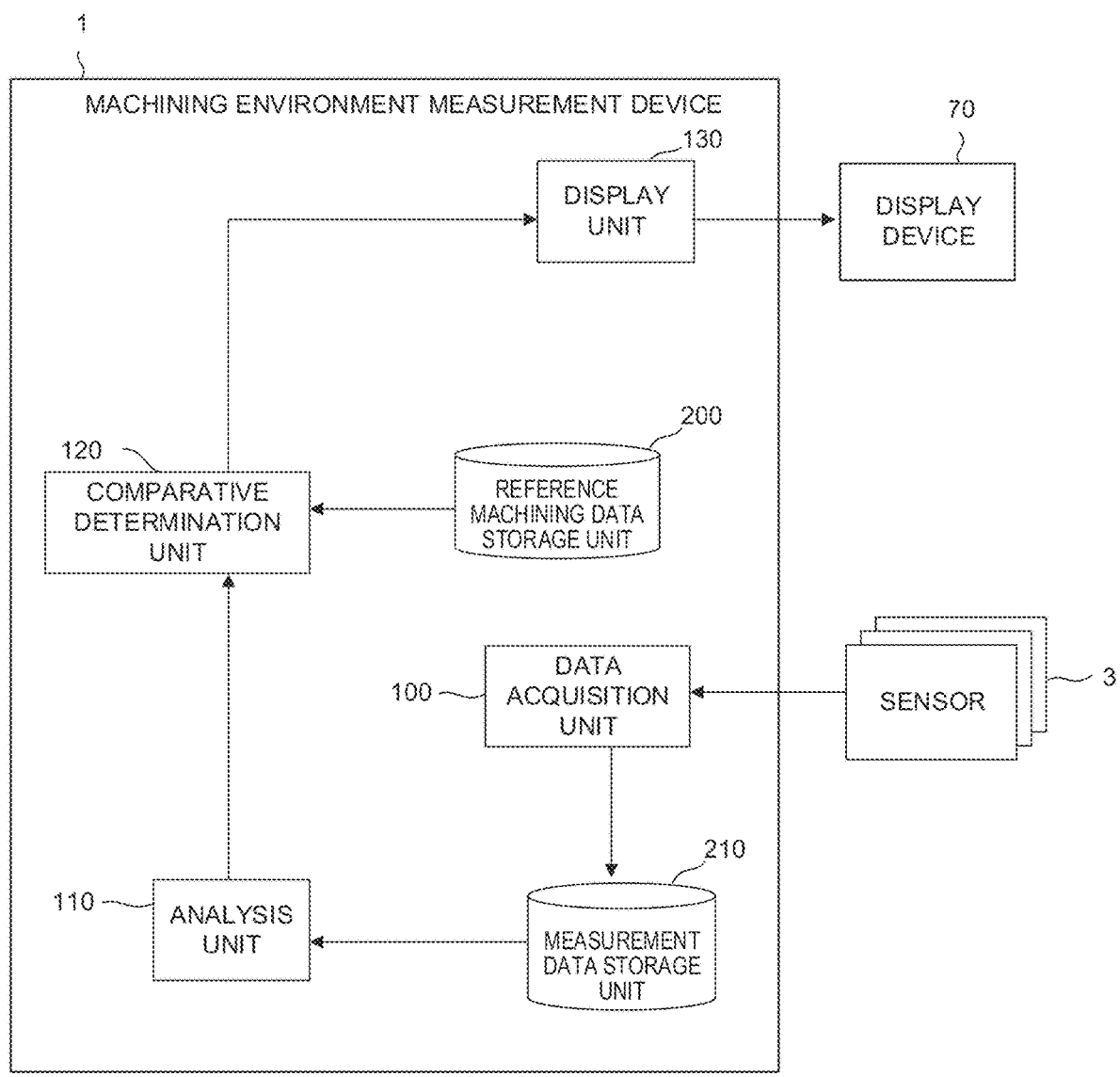
FIG. 2 is a schematic functional block diagram of a machining environment measurement device according to a first embodiment.

FIG. 2 is a schematic functional block diagram of the machining environment measurement device 1 according to the first embodiment. The functions of the functional blocks illustrated in FIG. 2 are implemented by the CPU 11 provided in the machining environment measurement device 1 illustrated in FIG. 1, where the CPU 11 executes the system program(s) and controls the operations of the individual units of the machining environment measurement device 1.

The machining environment measurement device 1 of this embodiment includes a data acquisition unit 100, an analysis unit 110, a comparative determination unit 120, and a display unit 130. Also, a reference machining data storage unit 200 is ensured in the non-volatile memory 14. Reference machining data associated with vibration and the like detected during execution of high quality machining is stored in advance in the reference machining data storage unit 200. The reference machining data serves as a criterion for evaluation of a machining environment.

Figure 3:
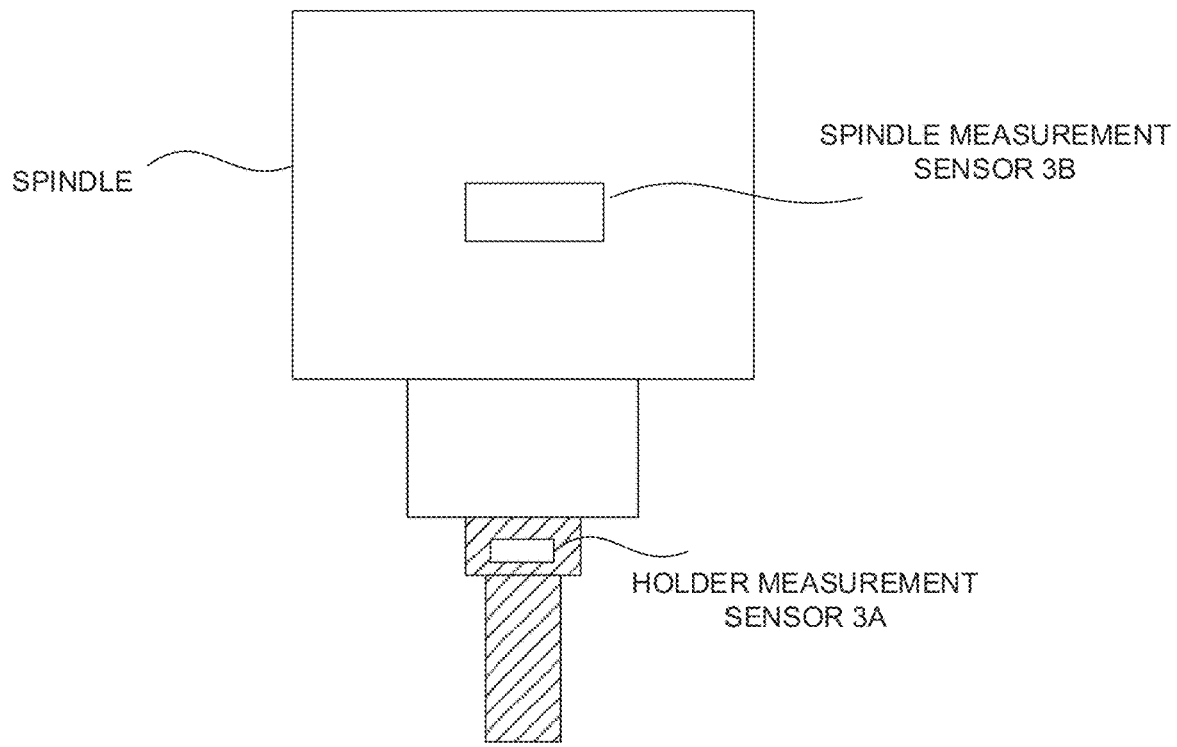
FIG. 3 is a diagram that illustrates a sensor for use in measurement of vibration.
Figure 4:
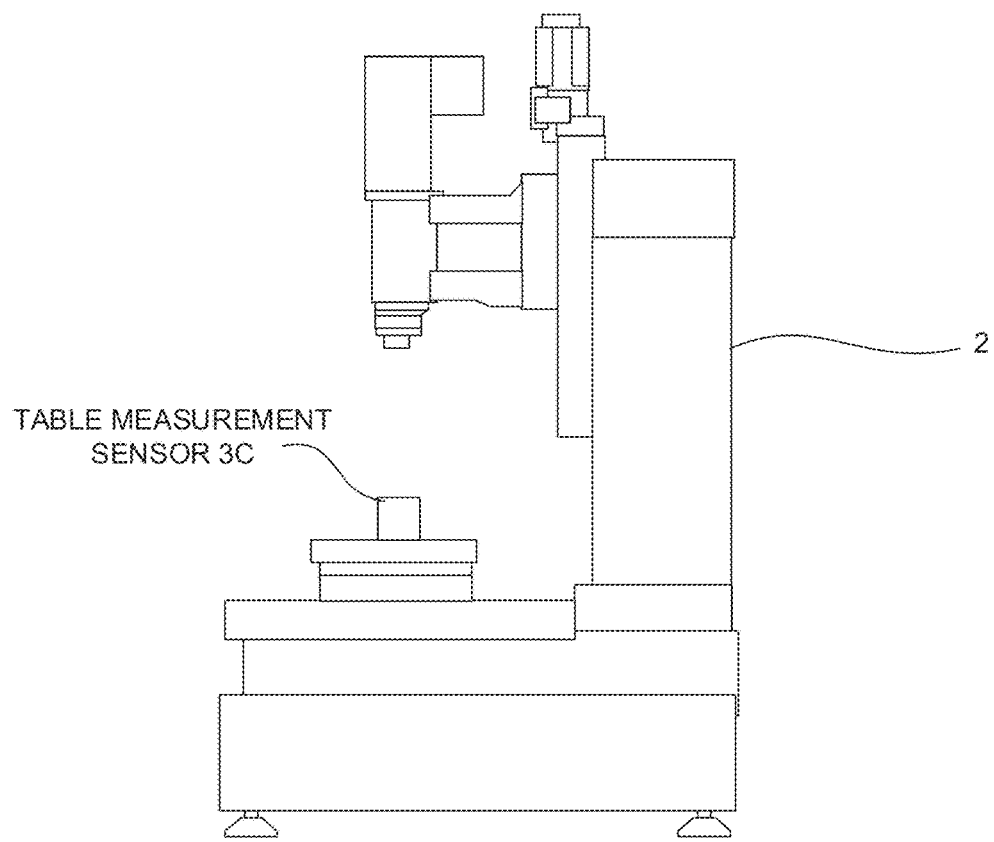
FIG. 4 is a diagram that illustrates a sensor for use in measurement of vibration.

The data acquisition unit 100 is a functional unit that acquires time-series data of physical quantities measured by the sensors 3 installed in the machine tool 2 and stores the time-series data in the measurement data storage unit 210 provided in the non-volatile memory 14. As the sensors 3 installed in the machine tool 2, for example, an acceleration sensor for detection of vibration is used. The sensors 3 are attached to various portions of the machine tool 2 so as to detect vibration of these respective portions of installation. The portions where the sensors 3 are installed may include, as illustrated in FIGS. 3 and 4, a portion of a holder attached to a spindle (holder measurement sensor 3A), the spindle (spindle measurement sensor 3B), and a table (table measurement sensor 3C). The holder measurement sensor 3A plays an important role in detecting the vibration transmitted to the tool during machining. The holder measurement sensor 3A is capable of not only detecting the vibration transmitted from the outside of the machine tool 2 but also detecting vibration and the like with weak energy occurring in the various units in the machine tool 2 (e.g., a fan for cooling a spindle motor, a fan installed inside the control panel, etc.) and transmitted through the inside of the spindle rotation mechanism. Also, while vibrations that occur during the rotation of the spindle vary depending on tools in use, these differing vibrations can be measured using the holder measurement sensor 3A. The spindle measurement sensor 3B is basically used in measurement of typical vibrations that occur during the rotation of the spindle. The table measurement sensor 3C detects typical vibrations transmitted to the table. The data acquisition unit 100 associates, for example, individual pieces of data that have been acquired with time data acquired from a not-shown real-time clock (RTC) or the like incorporated in the machining environment measurement device 1. The data acquisition unit 100 generates the time-series data in this manner and stores the individual pieces of data in the measurement data storage unit 210. The data acquisition unit 100 may store the time-series data created on the machine tool 2 in the measurement data storage unit 210 on an as-is basis. The time-series data which the data acquisition unit 100 stores in the measurement data storage unit 210 may be a set of values associated with time (discrete values). Also, the time-series data which the data acquisition unit 100 stores in the measurement data storage unit 210 may be an approximate expression (continuous value) determined based on discrete values.

The analysis unit 110 is a functional unit that analyzes the time-series data stored in the measurement data storage unit 210. The analysis unit 110 analyzes the individual pieces of the time-series data stored in the measurement data storage unit 210 using known analysis schemes such as spectral analysis and damping vibration analysis. The analysis unit 110 computes feature data indicative of a feature of the individual pieces of the time-series data such as a frequency component included in the time-series data; acceleration, speed, displacement, damping rate and the like of the frequency component.

The comparative determination unit 120 is a functional unit that compares the feature data computed by the analysis unit 110 with the reference machining data stored in the reference machining data storage unit 200 and determines quality of the machining environment on the basis of the result of the comparison. The comparative determination unit 120 may compare the time-series data stored in the measurement data storage unit 210 with the reference machining data, which is stored in the reference machining data storage unit 200 and corresponds to the time-series data using a predetermined comparison expression which is defined in advance. The comparative determination unit 120 computes a score corresponding to the measured time-series data on the basis of the result of the comparison. The comparative determination unit 120 may determine the quality of the machining environment measured on the basis of the computed score. The comparative determination unit 120 may perform not only the determination of the quality but also determination of the machining environment measured on the basis of the computed score in accordance with a scheme of evaluation that evaluates the machining environment according by a plurality of grades of rating.

The display unit 130 is a functional unit that displays the result of determination of the quality of the machining environment by the comparative determination unit 120. The result of determination is displayed via the interface 18 on the display device 70.

The following paragraphs will describe the measurement of the machining environment and the flow of analysis and comparative determination operations regarding the machining environment measured by the machining environment measurement device 1 having the above-described features.

The machining environment measurement device 1 causes, for example, prior to start of the machining process, the machine tool 2 to perform a predetermined benchmark operation. The operation of the machine tool 2 in the benchmark operation and the measurement of the machining environment by the machining environment measurement device 1 may be performed, for example, through cooperation of the machine tool 2 and the machining environment measurement device 1 in accordance with a program or programs.

The benchmark operation may include, for example, an operation by the holder measurement sensor 3A for measurement of the vibration transmitted to the holder and an operation by the spindle measurement sensor 3B for measurement of the vibration during the rotation of the spindle. Also, the benchmark operation may also include, for example, an operation by the table measurement sensor 3C for measurement of the vibration during stoppage of the table, and an operation by the table measurement sensor 3C for measurement of the vibration during the operation of the table.

The operation by the holder measurement sensor 3A for measurement of the vibration transmitted to the holder is performed mainly for detection of vibration occurring in the machine. For this reason, the measurement by the holder measurement sensor 3A is preferably performed in a state where the rotation of the spindle is stopped. The measurement by the holder measurement sensor 3A may be performed simultaneously with the measurement of the vibration by the spindle measurement sensor 3B in a state where the spindle is rotating. In this case, measurement data with a certain degree of reliability can be obtained from the difference between the value of the time-series data of the vibration measured by the spindle measurement sensor 3B and the value of the time-series data of the vibration measured by the holder measurement sensor 3A. The operation by the holder measurement sensor 3A for measurement of the vibration transmitted to the holder is performed for a predetermined period of time (e.g., 10 seconds). The result of the measurement is acquired as time-series data by the data acquisition unit 100 and stored in the measurement data storage unit 210.

The operation by the spindle measurement sensor 3B for measurement of the vibration during the rotation of the spindle is mainly performed for detection of vibration occurring due to a defect of the spindle. The operation by the spindle measurement sensor 3B for measurement of the vibration during the rotation of the spindle is performed at predetermined speeds of rotation of the spindle speed (e.g., in the range from 100 rpm to 24000 rpm at 100 rpm intervals or the like). The results of measurements of the vibrations are acquired by the data acquisition unit 100 as time-series data and are stored in the measurement data storage unit 210.

The operation by the table measurement sensor 3C for measurement of the vibration during stoppage of the table is mainly performed for detection of the influence of the vibration outside the machine tool 2. The operation by the table measurement sensor 3C for measurement of the vibration during the stoppage of the table is performed for a predetermined period of time (e.g., 10 seconds). The results of measurements are acquired by the data acquisition unit 100 as time-series data and are stored in the measurement data storage unit 210.

Figure 5:
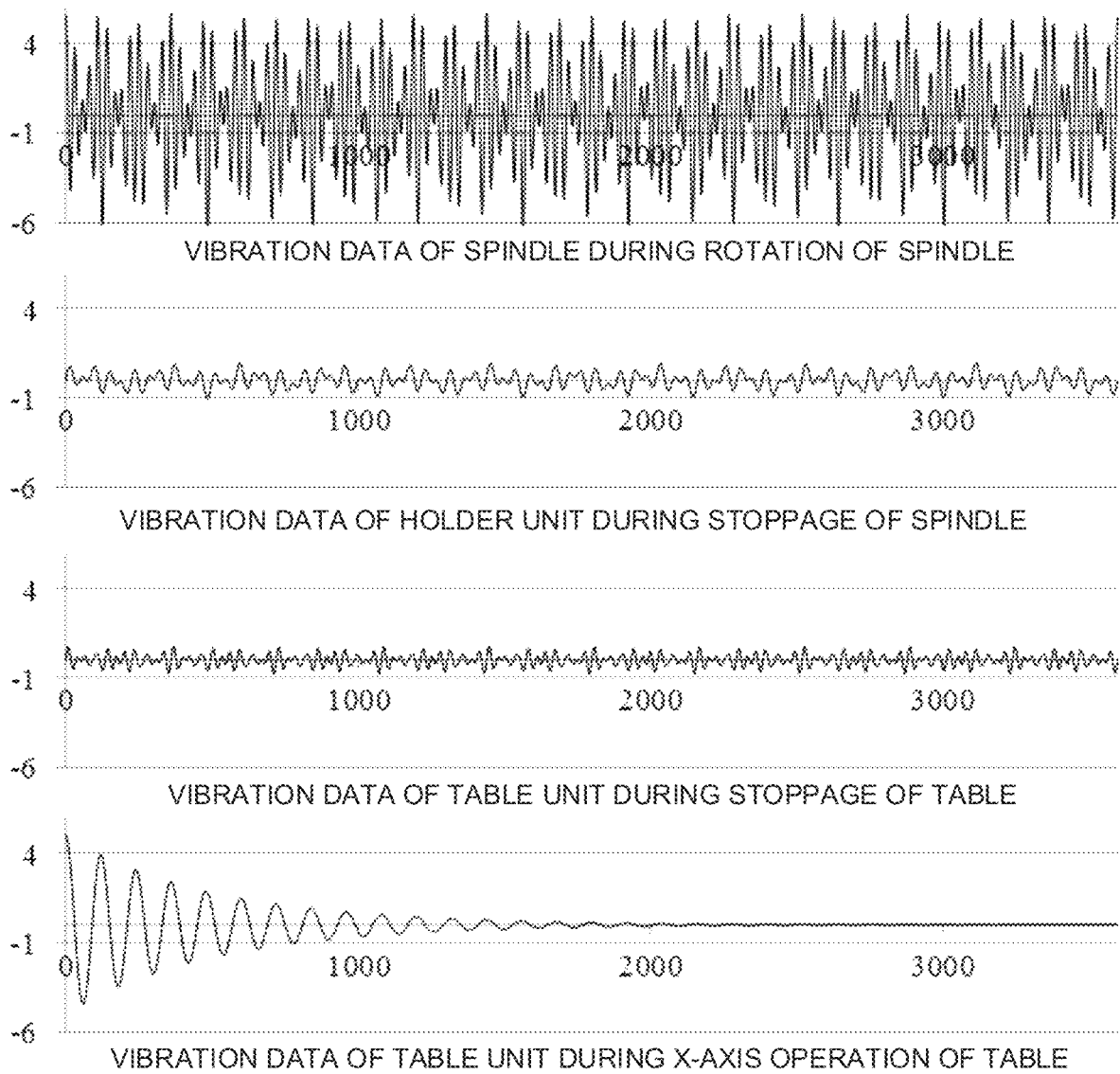
FIG. 5 is a diagram that illustrates an example of time-series data acquired as a result of a benchmark operation.

The operation by the table measurement sensor 3C for measurement of the vibration during the operation of the table is performed for determination of the state of installation of the machine tool 2 (inaccurate levelling, erroneously adjusted height, inaccurate parallelism, etc.). The operation by the table measurement sensor 3C for measurement of the vibration during the operation of the table is performed with the table moved at a predetermined feedrate in an axial direction in which it can move (X-axis direction, Y-axis direction, etc.) in the range from zero to the maximum amount of travel. The results of measurements are acquired by the data acquisition unit 100 as time-series data and are stored in the measurement data storage unit 210. FIG. 5 illustrates an example of the time-series data indicative of the vibrations of the individual units acquired in the above-described manner.

The respective pieces of time-series data stored in the measurement data storage unit 210 are analyzed by the analysis unit 110. The analysis unit 110 performs analysis on, for example, the time-series data measured by the holder measurement sensor 3A during stoppage of the spindle, the time-series data measured by the spindle measurement sensor 3B during the rotation of the spindle, and the time-series data measured by the table measurement sensor 3C during stoppage of the table. The analysis unit 110 performs known spectral analysis such as fast Fourier transform (FFT) on these pieces of time-series data. The analysis unit 110 computes feature data indicative of a feature of the time-series data such as acceleration (m/s$^2$), speed (mm/s), and displacement (m) regarding a main frequency component (frequency component with large amplitude) included in the time-series data. FIG. 6 is an example of the result of the analysis of the time-series data measured by the spindle measurement sensor 3B during the rotation of the spindle. The feature data should be computed from a frequency component having large amplitude. For example, the feature data may be computed from frequency components by a predetermined number starting from the one that has the largest amplitude (top two components, top ten components, etc.) from among the frequency components obtained by the analysis. Specifically, the feature data does not need to be computed from frequency components having small amplitude. The analysis unit 110 performs spectral analysis in the same or similar manner on the time-series data measured by the holder measurement sensor 3A during stoppage of the spindle and the time-series data measured by the table measurement sensor 3C during stoppage of the table. The analysis unit 110 thereby computes feature data indicative of a feature of the time-series data such as acceleration, speed, displacement, etc. Meanwhile, the analysis unit 110 performs damping vibration analysis on the time-series data measured during the operation of the table by the table measurement sensor 3C and computes the damping rate of the vibration as the feature data.

The feature data computed in this manner by the analysis unit 110 is compared, by the comparative determination unit 120, with the reference machining data stored in the reference machining data storage unit 200. The reference machining data is feature data regarding each piece of the time-series data obtained as a result of the analysis being performed on the time-series data measured by the holder measurement sensor 3A, the spindle measurement sensor 3B, and the table measurement sensor 3C when the benchmark operation is performed in the ideal machining environment in the same or similar manner as described above. FIG. 7 is an example of feature data (reference machining data) stored in the reference machining data storage unit 200 and computed by analyzing the time-series data measured by the spindle measurement sensor 3B when the rotation of the spindle is performed in the ideal machining environment.

FIG. 8 illustrates an example of computation of a score X of the time-series data by the comparative determination unit 120. The comparative determination unit 120 compares (a) a distance Di between a parameter of the frequency Si included in the feature data and a parameter of the frequency Fi included in the reference machining data corresponding to the frequency Si, where these parameters are handled as vectors, and (b) predetermined thresholds Th1 to Th3. The comparative determination unit 120 computes a score Xi at the frequency on the basis of the result of comparison. The comparative determination unit 120 computes the average of the scores given to all the frequencies included in the feature data and thereby computes the score X of the time-series data. When the comparative determination unit 120 determines the distance between the parameter of the frequency Si and the parameter of the frequency Fi, the comparative determination unit 120 may assign a weight to a square of the difference between these parameters. Also, if the reference machining data of the frequency that corresponds to the frequency Si included in the computed feature data is not stored in the reference machining data storage unit 200, then the score Xi of this frequency may be determined as zero. It should be noted that, with regard to the time-series data measured by the table measurement sensor 3C during the operation of the table, a score can be determined by handling the time-series data as a one-dimensional vector with one parameter "damping rate" and performing computation in the same or similar manner as described above.

In addition, the comparative determination unit 120 computes the average of the scores computed on the respective pieces of time-series data and performs evaluation of the machining environment, for example, on the basis of a determination criterion as illustrated in FIG. 9. The symbol "A" in the determination criterion illustrated in FIG. 9 indicates that high quality machining can be performed, "B" indicates that a finishing can be performed, "C" indicates that normal machining can be performed, "D" indicates that roughing can be performed, and "E" indicates that the machining environment is not suitable for machining. In other words, the machining environment is evaluated in such a manner that each determination criterion is associated with the content of machining that can be performed in the machining environment.

The result of evaluation determined by the comparative determination unit 120 is displayed by the display unit 130 on the display device 70. The result of evaluation displayed by the display unit 130 is a comprehensive evaluation regarding the machining environment such as "Evaluation of machining environment: D; roughing can be performed." The display unit 130 may individually display, in addition to this, the scores X given to the holder unit, the spindle unit, and the table unit. The display unit 130 may display the score Xi computed for each frequency. Further, the display unit 130 may display history of the respective scores computed in the past in the form of a graph. The operator views what is displayed on the display device 70 and determines whether or not the current machining environment is suitable for the machining process to be performed. Also, the operator, who views the scores displayed (e.g., scores for each frequency), is allowed to infer the cause of the vibration and address the problem. Also, the operator who checks the graph display of the history of the respective scores computed in the past is allowed to readily perform the determination regarding repair work to respond to aging degradation etc. or perform any other appropriate actions.

Figure 10:
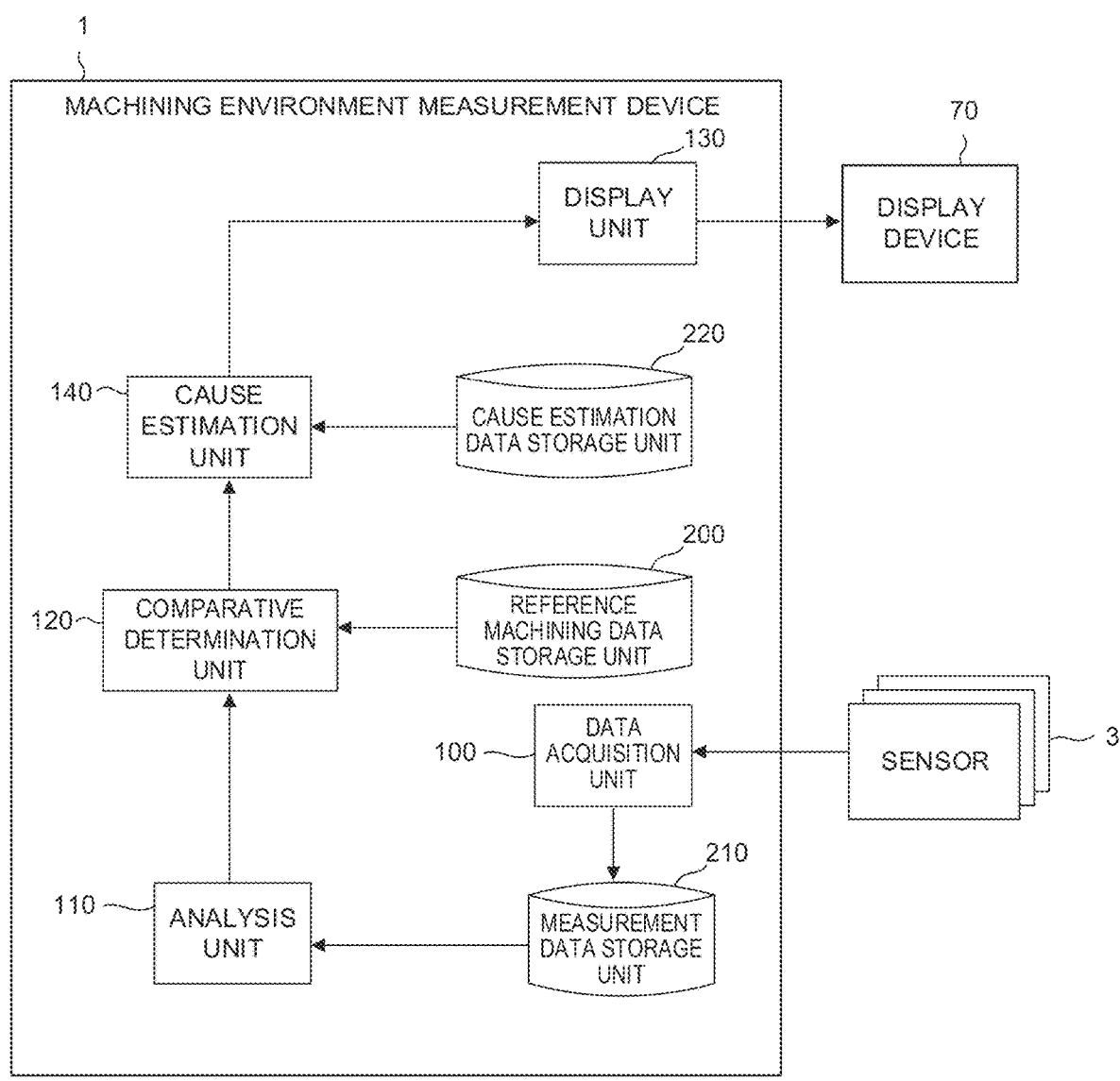
FIG. 10 is a schematic functional block diagram of a machining environment measurement device according to a second embodiment.

FIG. 10 is a schematic functional block diagram of a machining environment measurement device 1 according to a second embodiment of the present disclosure. The individual functional blocks illustrated in FIG. 10 are implemented by the CPU 11 provided in the machining environment measurement device 1 illustrated in FIG. 1 executing the system program and controlling the operations of the individual units of the machining environment measurement device 1.

The machining environment measurement device 1 of this embodiment further includes a cause estimation unit 140 in addition to the functional units described in the context of the first embodiment. Also, the non-volatile memory 14 includes a cause estimation data storage unit 220 which stores cause estimation data, where the guidance regarding a cause of the vibration detected at each unit is associated with a location where the vibration occurs and the main frequency component of the vibration.

The cause estimation unit 140 is a functional unit that refers, on the basis of the result of the determination by the comparative determination unit 120, to the cause estimation data stored in the cause estimation data storage unit 220 and outputs a guidance regarding a cause of the vibration. The cause estimation data storage unit 220 stores, for example, as illustrated in FIG. 11, the cause estimation data. The cause estimation data is data in which (a) at least one location where the vibration occurs and at least one main frequency component are associated with (b) a guidance indicative of a matter estimated to be the cause of the vibration. The main frequency component in the cause estimation data includes a value indicative of a frequency or a value indicative of a range of frequency. The cause estimation unit 140 extracts, from the result of the determination by the comparative determination unit 120, a location having a low score (a location where vibration is considered to have occurred) and a frequency having a low score. The cause estimation unit 140 compares the extracted location and frequency with the cause estimation data stored in the cause estimation data storage unit 220. The cause estimation unit 140 reads a guidance corresponding to the extracted location and frequency and output them to the display unit 130 together with the result of the determination by the comparative determination unit 120.

The cause estimation data stored in the cause estimation data storage unit 220 is created on the basis of main frequency component of the vibration occurring when a problem is caused to arise at a portion that may become the cause of the vibration in advance. For example, if the benchmark operation is performed while the fan A or the fan B in the control panel is replaced by a fan that has been degraded with age and the degraded fan is operated, then the vibration originating from the fan A or the fan B is weak. In addition, it will be confirmed that the vibration will be only transmitted to the holder unit and the frequency of the vibration depend on the rotation speed of the fan A. The cause estimation data created by repeatedly performing such confirmation work (experiment) is stored in advance in the cause estimation data storage unit 220. The cause estimation data is used in the estimation of the cause of the vibration by the cause estimation unit 140.

Whilst one embodiment of the present disclosure has been described in the foregoing paragraphs, the present disclosure is not limited to the above-described examples of the embodiments and can be implemented in various modes with modifications made thereto as appropriate.

The invention claimed is:

1. A machining environment measurement device for measuring an influence of a vibration on a machining process in a machine tool, the machining environment measurement device comprising:
   a reference machining data storage unit configured to store reference machining data computed on the basis of time-series data of vibration measured in advance in an ideal machining environment;
   a data acquisition unit configured to acquire time-series data of vibration of at least a holder attached to a spindle of the machine tool, wherein the vibration of the holder is detected by a holder measurement sensor;
   an analysis unit configured to
      analyze the time-series data acquired by the data acquisition unit and
      compute feature data indicative of a feature of the time-series data;
   a comparative determination unit configured to
      perform a comparison that compares
         (a) a distance Di between (1) parameters at a first frequency Si among frequencies included in the feature data indicative of the feature of the time-series data computed by the analysis unit and (2) the parameters at a second frequency Fi corresponding to the first frequency and included in the reference machining data stored in the reference machining data storage unit, with
         (b) predetermined thresholds,
      compute a score Xi for the frequencies Si and Fi on the basis of a result of the comparison,
      compute an average of the scores given to all the frequencies included in the feature data, as a score X of the time series data, and
      based on the score X of the time series data, make determination of a machining environment of the machine tool; and
   a display unit configured to display a result of the determination made by the comparative determination unit,
   wherein the comparative determination unit is further configured to
      determine the distance Di between the parameters at the first frequency Si and the parameters at the second frequency Fi according to Equation (1) below while assigning a weight to the square of the difference between the parameters:

$$\text{DISTANCE Di BETWEEN } Si \text{ AND } Fi = \sqrt{(F_{Ai}-S_{Ai})^2(F_{Vi}-S_{Vi})^2+(F_{Di}-S_{Di})^2} \quad (1),\text{ and}$$

determine the score X of the time series data according to Equation (2) below:

$$\text{SCORE X OF TIME SERIES DATA} = \frac{1}{n}\sum Xi, \quad (2)$$

where $S_{Ai}$, $S_{Vi}$ and $S_{Di}$ are first through third parameters, respectively, at the first frequency Si, and $F_{Ai}$, $F_{Vi}$ and $F_{Di}$ are the first through third parameters, respectively, at the second frequency Fi.

2. The machining environment measurement device according to claim 1, wherein the data acquisition unit is further configured to acquire at least either of (a) time-series data of vibration of the spindle of the machine tool, the vibration of the spindle being detected by a spindle measurement sensor, and (b) time-series data of vibration of a table of the machine tool, the vibration of the table being detected by a table measurement sensor.

3. The machining environment measurement device according to claim 1, wherein the analysis unit is configured to compute the feature data indicative of the feature of the time-series data through spectral analysis.

4. The machining environment measurement device according to claim 1, wherein the display unit is configured to display a score for a location of the machine tool where the detected vibration occurs, the score being displayed with respect to a main frequency component of the detected vibration at the location of the machine tool.

5. The machining environment measurement device according to claim 1, further comprising:

a cause estimation data storage unit configured to store cause estimation data in advance, the cause estimation data associating a location at which a vibration is detected and a main frequency component of the vibration with a guidance related to a cause of the vibration; and a cause estimation unit configured to refer to the cause estimation data storage unit and estimate a cause of vibration on the basis of a result of analysis by the analysis unit, wherein the display unit is further configured to display a result of estimation of the cause of the vibration estimated by the cause estimation unit.

6. The machining environment measurement device according to claim 1, wherein the data acquisition unit is further configured to acquire both (a) time-series data of vibration of the spindle of the machine tool, the vibration of the spindle being detected by a spindle measurement sensor, and (b) time-series data of vibration of a table of the machine tool, the vibration of the table being detected by a table measurement sensor.

7. The machining environment measurement device according to claim 6, wherein the display unit is configured to display a score for the spindle, the holder or the table where the vibration occurs during the machining process, the score being displayed with respect to a frequency component of the detected vibration of the spindle, the holder, or the table where the vibration occurs during the machining process.

8. The machining environment measurement device according to claim 1, wherein the parameters are vectors.

9. The machining environment measurement device according to claim 1, wherein $S_{Ai}$, $S_{Vi}$ and $S_{Di}$ are acceleration, speed and displacement, respectively, at the first frequency Si, and $F_{Ai}$, $F_{Vi}$, and $F_{Di}$ are acceleration, speed and displacement, respectively, at the second frequency Fi.

* * * * *